United States Patent [19]

F'Geppert

[11] Patent Number: 4,805,489
[45] Date of Patent: Feb. 21, 1989

[54] INFINITELY VARIABLE RATIO TRANSMISSION

[75] Inventor: Erwin F'Geppert, Oakland, Mich.

[73] Assignee: The United States of America as represented by the Secretary of the Army, Washington, D.C.

[21] Appl. No.: 96,993

[22] Filed: Sep. 16, 1987

[51] Int. Cl.$^4$ .......................... F16H 3/44; F16H 57/10
[52] U.S. Cl. ......................................... 74/793; 74/794; 74/782
[58] Field of Search ...................... 74/781 R, 782, 784, 74/794, 796, 793

[56] References Cited

U.S. PATENT DOCUMENTS

| | | | |
|---|---|---|---|
| 1,299,629 | 4/1919 | Snider | 74/793 |
| 2,051,187 | 8/1936 | Strigl | 74/782 X |
| 2,301,292 | 11/1942 | Krick | 74/794 X |
| 2,559,923 | 7/1951 | Alspaugh | 74/784 X |
| 2,604,799 | 7/1952 | Hinton | 74/782 X |
| 3,511,113 | 5/1970 | Rheault | 74/794 |
| 3,899,941 | 8/1975 | Cook | 74/781 R |
| 4,532,828 | 8/1985 | LaGuardia | 74/793 |
| 4,610,184 | 9/1986 | Taylor | 74/794 |
| 4,625,588 | 12/1986 | Brickley | 74/793 |

OTHER PUBLICATIONS

Power Transmission & Bearing Handbook, 1975–1976, copyright 1974 by Industrial Publishing Co., Division of Pittway Corporation, pp. 141–143.

Primary Examiner—Dirk Wright
Attorney, Agent, or Firm—Peter A. Taucher; David L. Kuhn

[57] ABSTRACT

An infinitely variable ratio transmission comprising an input sun gear, a plurality of orbiting planet gears, and an output sun gear. One of the planet gears is engaged with a nominally stationary sun gear. A disc brake retains the stationary gear in place against load forces.

5 Claims, 1 Drawing Sheet

INFINITELY VARIABLE RATIO TRANSMISSION

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a transmission usable between an engine (or other prime mover) and a vehicle drive shaft. The principal aim of the invention is to provide a variable ratio transmission that can be manufactured at relatively low cost. The invention is viewed as an improvement or alternative to the transmission disclosed in U.S. Pat. No. 3,899,941 issued on Aug. 19, 1975 to J.F. Cook.

THE DRAWINGS

Figure 1:
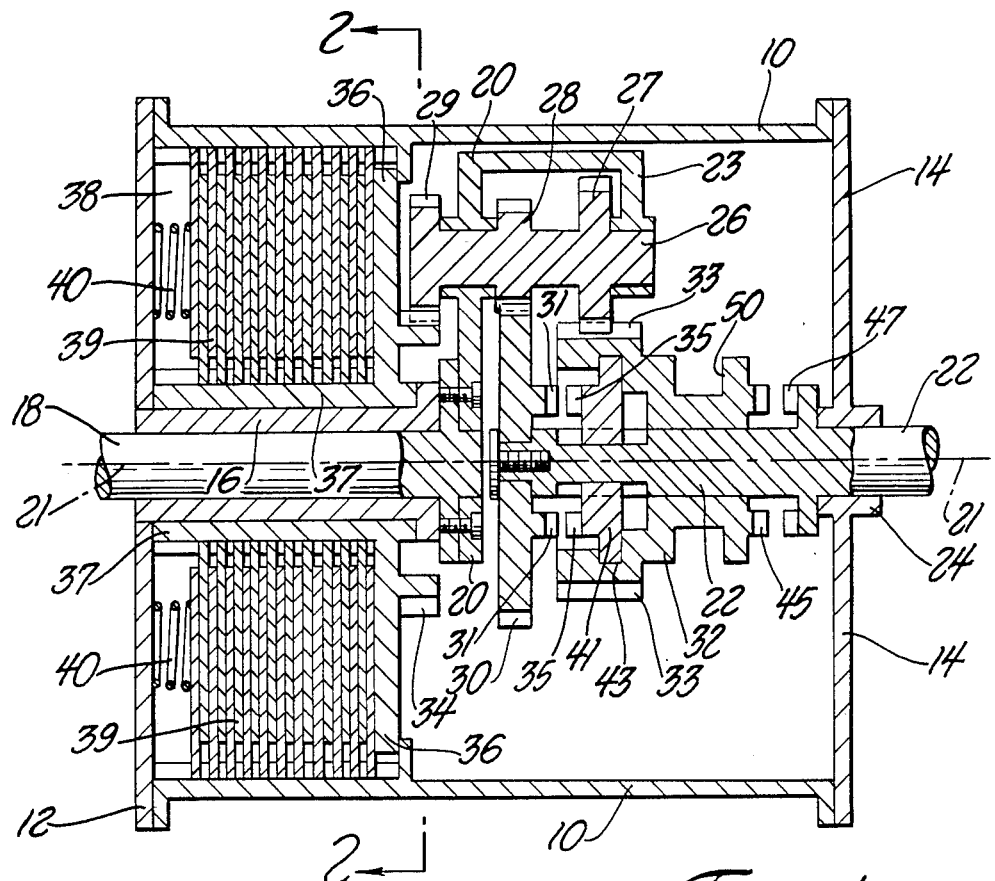
FIG. 1 is a sectional view taken through a transmission that embodies my invention.

Referring in greater detail to the drawings, there is shown in semi-structural form a transmission that includes a stationary housing defined by a generally annular (tubular) section 10, first end plate 12, and second end plate 14. A sleeve 16 is affixed to plate 12 to rotatably support a powered input shaft 18.

A plate-like carrier 20 is affixed to the right (inner) end of shaft 18 for conjoint rotation around shaft axis 21. An output shaft 22 is rotatably supported in a sleeve 24 that extends axially from end plate 14. The two shafts 18 and 22 rotate independently on a common rotational axis 21.

Carrier 20 has a freely-rotatable planet shaft 26 extending therethrough. The planet shaft carries a first power-transmitting planet gear 28 and a second reaction planet gear 29. The planet shaft also carries a third power-transmitting gear 27. An arm structure 23 is secured to the outer end of carrier 20 to provide auxiliary support for shaft 26 and the associated gears 27, 28 and 29. During service, carrier 20 rotates around axis 21; gears 27, 28 and 29 act as planet gears.

Planet gear 28 is sized to mesh with an output sun gear 30 located for free rotation on the left end of output shaft 22. The connection between gear 30 and shaft 22 is such that the gear can freely rotate on the shaft. A series of clutch teeth 31 are affixed to the right face of gear 30.

Planet gear 27 is sized to mesh with a gear 33 that is affixed to an annular barrel structure 32. The barrel structure is freely rotatable on the outer surface of shaft 22. Additionally, the barrel structure can slide along shaft 22 in the axial direction. As shown in FIG. 1, barrel structure 32 is in a centered position of adjustment; it can be moved to the right or to the left.

An annular clutch member 41 is slidably mounted on a splined section of shaft 22, such that teeth 35 on the left face of member 41 can move into, or out of, engagement with teeth 31 on gear 30.

Member 41 includes a radial flange that captively extends into a groove 43 in barrel structure 32. When the barrel structure is moved along shaft 22 member 41 is automatically drawn along with structure 32. The barrel structure serves as an operator for member 41.

As noted previously, barrel structure 32 can rotate freely on shaft 22. Member 41 can slide axially on shaft 22, but it cannot rotate the shaft.

The right end face of barrel structure 32 defines clutch teeth 45. Mating clutch teeth 47 are suitably affixed to shaft 22. When barrel structure 32 is moved to the right, teeth 45 are engaged with teeth 47; teeth 35 are disengaged from teeth 31. When barrel structure 32 is moved to the left, teeth 35 are engaged with teeth 31; teeth 45 are disengaged from teeth 47.

During normal run periods barrel structure 32 has a fixed position of axial adjustment on output shaft 22, i.e., the barrel structure is not movable along the shaft when the transmission is transferring power from the engine to the vehicle wheels. The barrel structure is moved along the shaft only when shifting between its three operating modes; forward, neutral and reverse. The barrel structure is shown in its neutral position. Rightward adjustment of the barrel structure puts it in the reverse mode. Leftward adjustment of the barrel structure puts it in the forward mode.

An annular groove 50 is provided in barrel structure 32 to accommodate a yoke-type operator (not shown) for moving the barrel structure to the right or to the left.

POWER TRANSMITTING PATHS

There are two possible power-transmitting paths. When barrel structure 32 is moved to the left a power transmission path is established from shaft 18, through carrier 20, gears 28 and 30, clutch teeth 31 and 35, member 41 and shaft 22. When barrel structure 32 is moved to the right another power transmission path is established from shaft 18, through carrier 20, gears 27 and 33, barrel structure 32, clutch teeth 45 and 47, and shaft 22. When barrel structure 32 is in its FIG. 1 centered position there is no power transmission path from shaft 18 to shaft 22.

REACTION BRAKE

The aforementioned planet gear 29 is in continuous mesh with a sun gear 34 that is suitably secured to a second reaction gear carrier 36. Gear carrier 36 is independently rotatable on the outer surface of aforementioned sleeve 16. During normal-run periods carrier 36 assumes a stationary motionless condition, such that sun gear 34 acts as a stationary reaction surface for rotating planet gear 29. However, during start-up periods, and other periods when the load (resistance to motion) offered by output shaft 22 is relatively high, carrier 36 is designed to rotate around axis 21 to absorb the excessive load forces.

Gear carrier 36 is maintained in a stationary position by means of a brake means 38. As shown in FIG. 1, the brake means comprises a series of annular friction discs 39. Alternate ones of these discs are keyed to the inner surface of housing member 10 and the outer surface of carrier sleeve 37. A plural number of compression springs 40 are trained between housing end plate 12 and the stack of discs, to maintain a predetermined drag force between carrier 36 and the stationary housing.

The annular chamber in which discs 39 are located is filled with oil to provide viscous drag action, as described for example in a publication titled "Power Transmission and Bearing Handbook, 1975-1975", copyright 1974 by Industrial Publishing Co., Division of Pittway Corporation; see particularly pages 141 through 143. The brake means 38 shown in FIG. 1 is a generally conventional structure already known and used in the transmission art.

OPERATION MODE—FORWARD DRIVE

Figure 2:
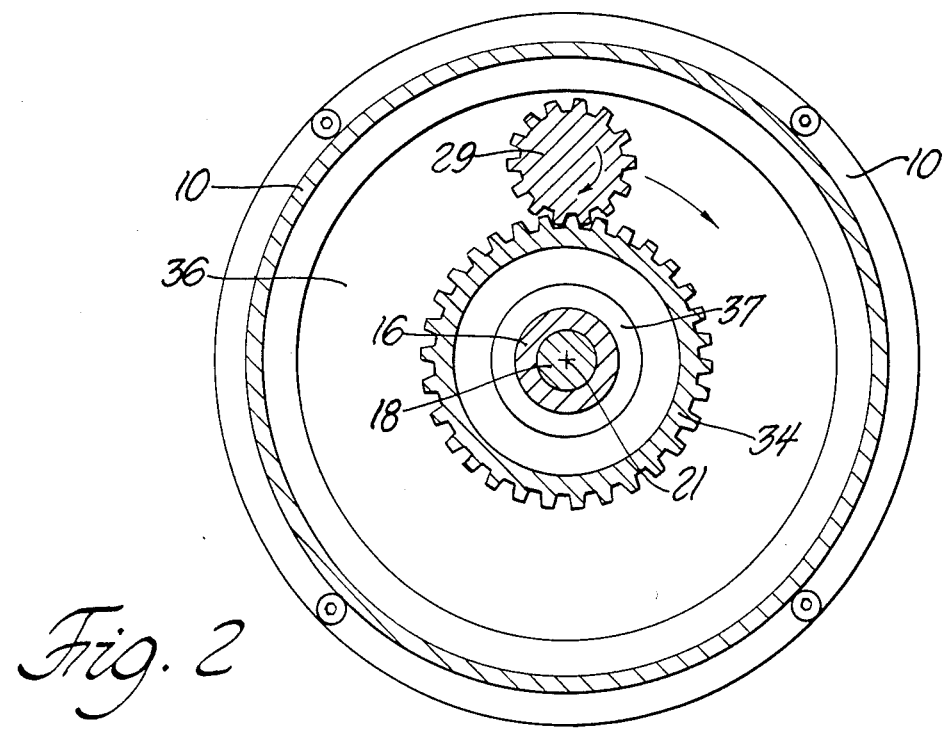
FIG. 2 is a sectional view taken on line 2—2 of FIG. 1.

Assume that the vehicle is in a stand-still condition, and that barrel structure 32 is shifted leftwardly to put clutch teeth 35 into engagement with clutch teeth 31. A power-transmission path is established from shaft 18, through carrier 20, gears 28 and 30, clutch teeth 31 and 35, annular member 41, and shaft 22. Assuming that the engine is operating to rotate shaft 18 and carrier 20 in a clockwise direction (arrow A in FIG. 2), planet gear 29 will apply a clockwise force to sun gear 34 (tending to move gear 34 counterclockwise). Brake means 38 exerts an opposing force tending to maintain gear 34 in a stationary position.

Assuming that gear 34 is stationary, gear 29 will move in the arrow A direction around axis 21. Additionally, gear 29 will move around the planet axis in a clockwise direction. The attached gear 28 (FIG. 1) will rotate around the planet axis to impart a turning force to gear 30 and output shaft 22. The complex motion of the planet gears (about two axes) causes two different forces to be applied to gear 30. Gear 28 movement around axis 21 tends to move output gear 30 in a clockwise direction; gear 28 movement around the planet axis tends tomove output gear 30 in a counterclockwise direction. The actual movement of gear 30 depends on the diameter of gear 28; with a smaller gear 28 diameter output gear 30 with move in a clockwise direction, whereas with a larger gear 28 diameter ouput gear 30 will move in a counterclockwise direction. For discussion purposes we will assume gear 28 to have a "small" diameter.

During initial start-up the drag force by brake 38 will be unable to keep gear 34 in a stationary condition. Gear 29 will be translated in the arrow A direction at the speed dictated by input shaft 18. The resistance offered by output gear 30 will impede rotation of gears 28 and 29 around the planet shaft axis; gear 29 may initially rotate counterclockwise around the planet shaft axis to move gear 34 clockwise. Brake 38 will eventually bring gear 34 to a stationary condition, wherein gear 29 rotates clockwise around the planet axis, as previously described.

The transmission is designed to gradually accelerate output shaft 22 from a standstill condition up to a maximum speed determined by the relative diameters of gears 29, 34, 28 and 30. The transmission absorbs shock loads (overloads) by rotation of carrier 36 against the drag force imposed thereon by brake means 38.

The transmission provides an infinite number of speed ratios, from a high speed ratio (at start-up) down to a lower ratio. Brake means 38 is initially adjusted (by spring 40 selection) so that the drag force is significantly higher than the normal running torque loading on the output shaft and slightly higher than the breakaway torque, i.e. the torque required to start shaft 22 into motion from a standstill condition. The brake means has zero slip at normal run (moderate load) conditions, with the ability to slip at high loads, e.g., at start-up. At start-up the brake means permits some slippage of sun gear 34, while planet gear 28 is applying torque to sun gear 30. Slippage of sun gear 34 subtracts from the rotational speed of output shaft 22, but not from the applied torque (limited by the brake means).

The final speed ratio (with gear 34 held stationary) is determined by the relative diameters of gears 34, 29, 28 and 30. For discussion purposes, assume that gear 34 has thirty-three teeth, gear 29 has thirteen teeth, gear 28 has ten teeth, and gear 30 has thirty-six teeth. For one revolution of carrier 20 gear 29 makes approximately 2.54 revolutions around the planet shaft axis; this figure derives from the ratio of the teeth on gears 34 and 29, i.e., 33/13. Gear 28 has the same rotational speed as gear 29, namely 2.54 revolutions.

Gear 30 rotates at a speed of 0.3 revolutions (clockwise). This figure is derived from the relationship $$\frac{(2.54 \times 10 \times -1) + 36}{36}$$

where 10 is the number of teeth on gear 28 and 36 is the number of teeth on gear 30. In this equation the "$-1$" term is to take into account the clockwise motion gear 28 around axis 21 and its counterclockwise effect upon gear 28. The speed ratio (input speed versus output speed) is about 3.4.

OPERATIONAL MODE—REVERSE DRIVE

The reverse drive mode is achieved by moving barrel structure 32 to the right (FIG. 1), such that clutch teeth 45 and 47 are engaged. The final speed ratio for the reverse drive mode is determined by the relatively diameters of gears 27 and 33.

For discussion purposes, assume that gear 27 has sixteen teeth, and gear 33 has thirty teeth. For one revolution of carrier 20 (clockwise) gear 27 makes 2.54 revolutions around the shaft 26 axis (per the previous calculation). Gear 33 rotates at $$\frac{(2.54 \times 16 \times -1) + 30}{30} = -.35 \text{ Revolutions Counterclockwise.}$$

The speed ratio is about 2.9.

Different speed ratios may be obtained by appropriate selection of the diameters of gears 27, 28, 29, 30 and 33. In the illustrated arrangement gear 29 has a diameter less than gear 27 but greater than gear 28. The diameter of gear 29 determines the rotational speed around the planet axis. The diameters of gears 28 and 27 determines the direction/speed of the output shaft for a given planet speed.

FEATURES OF THE INVENTION

The illustrated system is believed advantageous over conventional arrangements wherein the drive force is transmitted through a disc clutch interposed between an input shaft and output shaft. In the conventional arrangement overload force is applied through the clutch onto the input shaft, whereas in the proposed arrangement an overlaod force is applied through the clutch (brake 38) onto a stationary housing. With the proposed arrangement a relatively high driving force is maintained on the output shaft, even under overload conditions.

The illustrated arrangement utilizes sun gears and planet gears, but no ring gears. This makes possible some speed ratios that are not possible with conventional planetary systems. The proposed system also enables the designer to more closely achieve a desired speed ratio, since there is no restriction on gear diameter because the planet gear must simultaneously mesh with a sun gear and a ring gear (same gear pitch must be used for three gears).

The illustrated arrangement is somewhat similar to the arrangement shown in U.S. Pat. No. 3,899,941 (FIGS. 1 and 2) issued to J. Cook. However, my design is believed to be more versatile than the Cook design in that with my design the planet gear diameters can be preselected to provide various different final speed ratios (in forward or reverse). With the Cook design the final speed ratio (as determined by the relative diameters of gears 52 and 22) will always be greater than 1 to 1. It is impossible with the Cook planetary gear design to achieve a 1 to 1 speed ratio.

My proposed arrangement is also believed to be advantageous as regards overall compactness (diameter of the housing), and gear complement (small number of gear pairs).

Some structural variations may be made while still practicing the invention. For example, the sun gears 30, 33 and 34 may be constructed as ring gears. Also, the diameters of gears 27, 28, 29, 30, 33 and 34 need not have precisely the aforementioned relationship. Other gear diameters can be used, depending on the final speed ratio (input speed/output speed) desired. The drawings show one planet gear assembly orbital about central axis 21; however in some cases two or three planet gear assemblies might be needed to effectively handle the applied loads.

The illustrated arrangement includes a shifter mechanism 32 for achieving a forward drive mode and a reverse drive mode. The shifter mechanism is an optional feature. My invention is concerned primarily with the gearing-brake means relation whereby an infinitely variable speed ratio can be obtained (during start-up).

The transmission is suitable for use in motor vehicles, but it may find application in other situations wherein an engine (or electric motor) is required to drive a load, with shock-absorption action.

I wish it to be understood that I do not desire to be limited to the exact details of construction shown and described for obvious modifications will occur to a person skilled in the art, without departing from the spirit and scope of the appended claims.

I claim:

1. A variable ratio vehicle transmission whose gear ratio is determined essentially only by torque on the output shaft of the transmission, comprising:
    a housing fixed in the vehicle;
    a power input shaft entering one end of the housing;
    a power output shaft entering the other end of the housing;
    a planet carrier mounted concentrically on the input shaft;
    a planet shaft mounted rotatably to the planet carrier;
    planet gears fixed coaxially to the planet shaft, one planet gear being a power transferring gear, a second planet gear being a reaction planet gear;
    a brake means rotatable about the input shaft sleeve for controlling the rate of rotation of the reaction planet gear about the planet shaft axis when the reaction planet gear orbits about the input shaft axis, the brake means having an inhibitor means for providing a substantially constant drag against rotation of the brake means about the input shaft;
    the brake means having a disk-like wall encircling the input shaft and a brake gear meshed with the reaction planet gear;
    the inhibitor means having two sets of annular friction disks disposed between the disk-like wall and the one end of the housing, one set of friction disks angularly fixed relative to the housing and the other set of disks angularly fixed relative to the disk-like wall, the disks of the one set alternated with disks from the other set, the inhibitor means further having at least one resilient member compressed between the one end of the housing and the friction disks, whereby the resilient member supplies a substantially constant drag to inhibit rotation of the reaction brake means about the input shaft;
    the transmission further comprising means for operatively connecting the transferring planet gear to the output shaft.

2. A variable ratio vehicle transmission whose gear ratio selection is determined essentially only by the resistance torque experienced by the output shaft of the transmission, comprising:
    a cylindrical housing fixed in the vehicle and having two opposed end plates;
    a sleeve for a power input shaft fixed to one end plate of the housing and protruded into the housing;
    a power input shaft connected to the vehicle engine and journalled within the input shaft sleeve;
    a sleeve for a power output shaft fixed to the other end plate of the housing and protruded into the housing;
    a power output shaft operatively connected to the vehicle wheels and journalled within the output shaft sleeve;
    a planet carrier mounted concentrically on the input shaft;
    a planet shaft extending rotatably through the planet carrier so that the planet shaft axis is parallel to the input and output shaft axes;
    two planet gears coaxially and fixedly mounted on the planet shaft, one planet gear being a power transferring gear, a second planet gear being a reaction planet gear at one end of the planet shaft;
    a reaction brake means rotatably mounted on the input shaft sleeve for controlling the ratio of rotation of the reaction planet gear on the planet shaft axis when the reaction planet gear orbits about the input shaft axis, the reaction brake means having an inhibitor means for providing a substantially constant anti-rotational drag against rotation of the reaction brake means on the input shaft collar;
    the reaction brake means having a reaction brake collar journalled on the input shaft collar, a disk-like wall fixed to one end of the reaction brake collar, a reaction brake gear fixed on the disk-like wall and meshed with the reaction planet gear on the planet shaft;
    the inhibitor means having two sets of annular friction disks concentric with the reaction brake collar disposed between the disk-like wall and the one end plate of the housing, one set of friction disks axially slidably mounted to the inner periphery of the housing but angularly fixed relatively to the housing and the other set of disks axially slideably mounted to the reaction brake collar but angularly fixed relative to the reaction brake collar, the friction disks of the one set alternated with friction disks from the other set, the inhibitor means further having at least one spring axially compressed between the one end plate of the housing and the friction disks, whereby the spring supplies a substantially constant anti-rotational drag to inhibit rotation of the reaction brake means about the input shaft collar;

the transmission further comprising a driven gear connected to the output shaft, the driven gear being toothed for meshed engagement with the transferring gear.

3. The device of claim 2 wherein the planet carrier has a first carrier collar for journallingly receiving the planet shaft, the reaction planet gear being at one axial side of the first carrier collar and the transferring gear being at the opposite axial side of the first carrier collar, whereby radial reaction forces from the reaction planet gear and the transferring gear offset each other's tendency to pivot the planet shaft out of parallel with the input and output shafts.

4. A variable ratio vehicle transmission whose gear ratio selection is determined essentially only by the resistance torque experienced by the output shaft of the transmission, comprising:

a stationary cylindrical housing having two opposed end plates and a cylinder axis extending therethrough;

a sleeve for a power input shaft fixed to one end plate of the housing and protruded into the housing;

a power input shaft connected to the vehicle engine and journalled within the input shaft sleeve;

a sleeve for a power output shaft fixed to the other end plate of the housing and protruded into the housing;

a power output shaft operatively connected to the vehicle wheels and journalled within the output shaft sleeve;

a planet carrier mounted concentrically on the input shaft;

a planet shaft extending rotatably through the planet carrier so that the planet shaft axis is parallel to the input and output shaft axes;

three planet gears concentrically and fixedly mounted on the planet shaft, one planet gear being a power transmitting gear disposed at one end of the planet shaft, a second planet gear being a reaction planet gear at the opposite end of the planet shaft, and a third planet gear being an intermediate planet gear disposed axially between the power transmitting planet gear and the reaction planet gear;

a reaction brake means entirely within the housing rotatably mounted on the input shaft sleeve for controlling the rate of rotation of the reaction planet gear on the planet shaft axis when the reaction planet gear orbits about the input shaft axis, the reaction brake means having an inhibitor means for providing a substantially constant anti-rotational drag against rotation of the reaction brake means on the input shaft collar;

the reaction brake means having a reaction brake collar journalled on the input shaft collar a disk-like wall fixed to one end of the reaction brake collar, a reaction sun gear fixed on the disk-like wall and meshed with the reaction planet gear on the planet shaft;

the inhibitor means having two sets of annular friction disks concentric with the reaction brake collar disposed between the disk-like wall and the one end plate of the housing, one set of friction disks axially slidably mounted to the inner periphery of the housing but angularly fixed relative to the housing and the other set of disks axially slideably mounted to the reaction brake collar, the friction disks of the one set alternated with friction disks from the other set, the inhibitor means further having at least one spring axially compressed between the one end plate of the housing and the friction disks, whereby the spring supplies a substantially constant anti-rotational drag to inhibit rotation of the reaction brake means about the input shaft collar;

the transmission further comprising a driven sun gear rotatably mounted on the output shaft at an axial position remote from the other end plate of the housing, one face of the driven sun gear defining a circular array of teeth pointed toward the other end plate, the circumferential edge of the driven sun gear being toothed for meshed engagement with the intermediate planet gear;

a radial flange inside the housing fixed on the output shaft at an axial position proximal to the other end plate of the housing, the radial flange defining an annular array of teeth pointed toward the driven sun gear;

a ring angularly fixed but axially slidable on the output shaft having a circular pattern of teeth for meshing engagement with the circular array of teeth on the driven sun gear;

a barrel rotatable and axially slidable on the output shaft and disposed between the driven sun gear and the radial flange, the barrel having an annular pattern of teeth at one end for meshing engagement with the annular array of teeth on the radial flange, the barrel including a cup open toward the driven sun gear for containing the ring, the inner peripheral wall of the cup defining an annular groove for receiving the circumferential edge of the ring whereby the ring and barrel slide axially as a unit, the barrel slidable toward the driven sun gear to engage the ring with the driven sun gear and disengage itself from the radial flange the slideable to a position where neither the driven sun gear nor the radial flange is engaged by the barrel or the ring, the cup having axially elongate teeth on its outer peripheral surface for constant meshing with the power transmitting gear on the planet shaft as the barrel axially slides.

5. The device of claim 4 wherein the planet carrier has a first carrier collar for journallingly receiving the planet shaft, the reaction planet gear being at one axial side of the first carrier collar and the transmitting gear being at the opposite axial side of the first carrier collar, whereby radial reaction forces from the reaction planet gear and the transmitting gear offset each other's tendency to pivot the planet shaft out of parallel with the input and output shafts; the planet carrier further having a second carrier collar for journallingly receiving the planet shaft, the first carrier collar being proximal to one end of the planet shaft and the second carrier collar being at the other end of the planet shaft, the planet carrier having a bridge rigidly connecting the two carrier collars.

* * * * *